United States Patent
Lin

[11] Patent Number: 6,059,136
[45] Date of Patent: May 9, 2000

[54] END CAP DEVICE FOR A FLANGED OPENING

[76] Inventor: Peter Lin, 525 Cardinal Dr., Dresher, Pa. 19025

[21] Appl. No.: 09/032,929

[22] Filed: Mar. 2, 1998

[51] Int. Cl.[7] .................................................. B65D 25/28
[52] U.S. Cl. ..................... 220/212.5; 220/375; 220/378
[58] Field of Search ................................ 220/212.5, 375, 220/378; 215/228, 306, 352, 276

[56] References Cited

U.S. PATENT DOCUMENTS

| | | | |
|---|---|---|---|
| 306,527 | 10/1884 | Rueter | 220/375 X |
| 343,646 | 6/1886 | Morehouse | 215/306 X |
| 385,256 | 6/1888 | Eggers | 220/375 X |
| 638,334 | 12/1899 | Hobert | 220/375 |
| 645,430 | 3/1900 | Smelker | 215/276 |
| 697,681 | 4/1902 | Smelker | 215/276 |
| 713,824 | 11/1902 | White . | |
| 1,223,880 | 4/1917 | Hough | 220/212.5 |
| 1,383,389 | 7/1921 | Davis, Jr. | 220/375 X |
| 2,220,879 | 11/1940 | Hayden et al. | 220/212.5 X |
| 2,397,440 | 3/1946 | Schwartz | 220/375 X |
| 4,568,115 | 2/1986 | Zimmerly . | |
| 4,657,284 | 4/1987 | Fiori . | |
| 4,986,431 | 1/1991 | McCarter | 220/375 X |
| 5,018,768 | 5/1991 | Palatchy . | |
| 5,353,944 | 10/1994 | Davis et al. | 220/375 X |
| 5,384,936 | 1/1995 | Van Walraven . | |
| 5,727,351 | 3/1998 | Neathery et al. | 52/20 |

FOREIGN PATENT DOCUMENTS

| | | | |
|---|---|---|---|
| 652174 | 10/1937 | Germany | 220/375 |

*Primary Examiner*—Stephen K. Cronin
*Attorney, Agent, or Firm*—LaMorte & Associates

[57] ABSTRACT

An end cap device for the flanged termination at the end of a container or a pipe. The end cap device includes a circular base having a peripheral edge, a bottom surface and a top surface. The top surface of the end cap base is beveled toward the bottom surface of the base in the regions proximate the peripheral edge. A shaft extends from the top surface of the base, wherein the shaft is oriented at a perpendicular relative the plane of the bottom surface of the base. A handle is connected to the shaft at a point between the two ends of the handle. A tether extends from the handle. The tether is formed into the configuration of a noose, wherein the noose can pass over the flanged termination the end cap device is designed to cover. The handle helps a person remove the end cap in a controlled manner while the tether prevents the end cap from falling. Both the entire end cap structure and the tether are made of stainless steel or another material that can be sterilized in an autoclave without corrosion.

15 Claims, 3 Drawing Sheets

END CAP DEVICE FOR A FLANGED OPENING

BACKGROUND OF THE INVENTION

1. Field of the Invention

The present invention relates end caps and similar closures that are used to seal the tops of containers and the open ends of pipes. More particularly, the present invention relates to the caps of pharmaceutical containers or pharmaceutical piping that are used in conjunction with a clamp to produce a hermetic seal around the opening of the container or pipe.

2. Description of the Prior Art

In the manufacture and processing of pharmaceutical products, dairy products and other materials that require a sanitary processing environment, it is common for materials transported in stainless steel containers. Once in a processing plant, pharmaceutical solutions are commonly pumped between points using a network of fixed pipes. To simplify processing, it is common for the containers and the pipes to have similarly shaped flanged openings. In this manner, containers can be readily joined to pipes and vise versa so that materials can be readily transferred between mobil containers and stationary piping.

Containers used in the pharmaceutical industry vary widely in shape size and volume. However, one common aspect of these containers is that they are commonly manufactured from stainless steel. In this manner, the containers can be sterilized in an autoclave if ever used to hold bio-hazardous or bio-active material.

Referring to FIG. 1, there is shown a prior art container 10 and a prior art end cap 12 for that container 10. The container 10 is of the STB-Series manufactured by Eagle Stainless Container of Horsham, Pa. The shown container 10 serves to exemplify containers commonly used to transport samples in the pharmaceutical industry. As can be seen from FIG. 1, the container 10 has a radial flange 14 disposed around the open top end 16 of the container 10. A groove 18 is disposed on the top surface 16 of the flange 14, wherein the groove 18 is shaped to retain part of a gasket 20. The bottom surface 22 of the flange 14 is angled, thereby providing the flange 14 with a tapered shape.

The end cap 12 shown typifies the type of cap currently used to seal pharmaceutical containers and pharmaceutical piping. The end cap 12 is a solid disk of stainless steel. A groove 24 is formed on the bottom surface of the end cap 12. The groove 24 on the end cap 12 aligns with the groove 18 on the flange 14 of the container 10. A section 26 of the top surface of the cap near the peripheral edge is beveled at the same angle as is the bottom surface 22 of the flange 14 on the container 10.

A gasket 20 is placed between the end cap 12 and the container 10. The gasket 20 fits within the grooves 24, 18 on the bottom of the end cap 12 and the top of the container 10, respectively. A pipe clamp (not shown) is then used to bias the end cap 12 against the container 10. Such pipe clamps are exemplified by U.S. Pat. No. 4,568,115 to Zimmerly, entitled Multi-Piece Pipe Clamp. The pipe clamp compresses the gasket 20 between the end cap 12 and the container 10, thereby making a hermetic seal. Since neither, the container 10 nor the end cap 12 contain threads, there are few places for contaminants to hide. Accordingly, both elements are readily cleaned and sterilized using a laboratory autoclave.

When a sample of material is sealed into a container, the material may then cool or change chemically over time. Similarly, the ambient air temperature may rise above that at the time the container was sealed. Both scenarios can cause the pressure within the sealed container to be less than ambient air pressure. As a result, a vapor lock occurs wherein the differential between internal and external air pressure causes end cap to remain set in place even after the pipe clamp is removed. In such situations a person must often pry the end cap off of the container using a screw driver or other tool. This requires a tool be at hand and also consume a great amount of time and effort. Furthermore, the prying procedure can cause damage to the container, the end cap, the gasket or can cause the contents of the container to spill.

End caps, such as that described, are also used to seal the ends of pipes in a pharmaceutical processing plant. In such situations, the end of the pipe may be elevated or at some other point that is hard to reach. If the end cap is pried off of the end of the pipe and is not caught, the end cap often falls to the ground. Since the end cap is solid stainless steel, it can easily injure a person, cause damage to some equipment it strikes or incur damage itself when striking another object.

In the prior art of lids and closures, there are many different lids that include protrusions so that those lids need not be pried from atop a container. Such prior art lids are exemplified by U.S. Pat. No. 1,437,572 to Vons, entitled Bottle Stopper and U.S. Pat. No. 742,652 to Hirst, entitled Jar or Bottle Closure. Such lid projections provide a small amount of leverage to remove a lid. However, such protrusions are not sufficient enough to enable a person to remove a solid stainless steel end cap from a vapor locked pipe or container in a controlled manner.

A need therefore exists for an end cap for a pharmaceutical container or pipe that can be removed from a vapor locked application without a tool and can be removed in a controlled manner without fear of the end cap falling or otherwise being dropped. Such a need is met by the present invention as described and claimed below.

SUMMARY OF THE INVENTION

The present invention is an end cap device for the flanged termination at the end of a container or a pipe. The end cap device includes a circular base having a peripheral edge, a bottom surface and a top surface. The top surface of the end cap base is beveled toward the bottom surface of the base in the regions proximate the peripheral edge. A shaft extends from the top surface of the base, wherein the shaft is oriented at a perpendicular relative to the plane of the bottom surface of the base. A handle is connected to the shaft at a point between the two ends of the handle. A tether extends from the handle. The tether is formed into the configuration of a noose, wherein the noose can pass over the flanged termination the end cap device is designed to cover. The handle helps a person remove the end cap in a controlled manner while the tether prevents the end cap from falling. Both the entire end cap structure and the tether are made of stainless steel or another material that can be sterilized in an autoclave without corrosion.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention end cap device can be used to seal most any container of pipe having a flanged end, the device is especially well suited for use in sealing pharmaceutical containers and pipes that have sanitary connections. Sanitary connections lack threads or other integrate shapes into which contaminants can harbor. Rather sanitary connections rely upon pipe clamps to join solid end caps to the open end of a container or pipe. Accordingly, the present invention end cap device will be described as an end cap for a sanitary connection of a pharmaceutical container or pipe.

Figure 1:
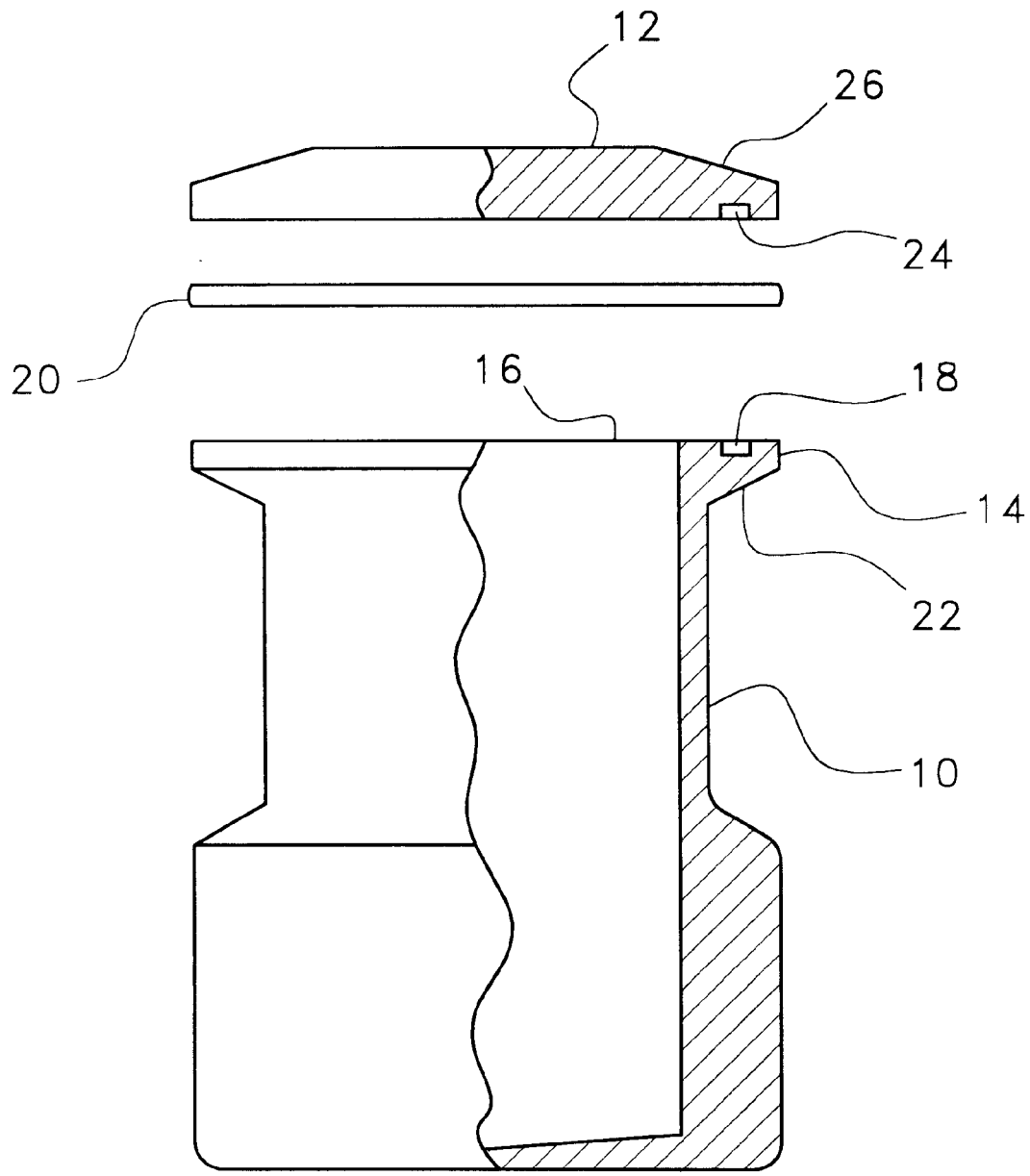
FIG. 1 is a selectively cross-sectioned view of a prior art pharmaceutical container and a prior art end cap typically used to seal such a container.
Figure 2:
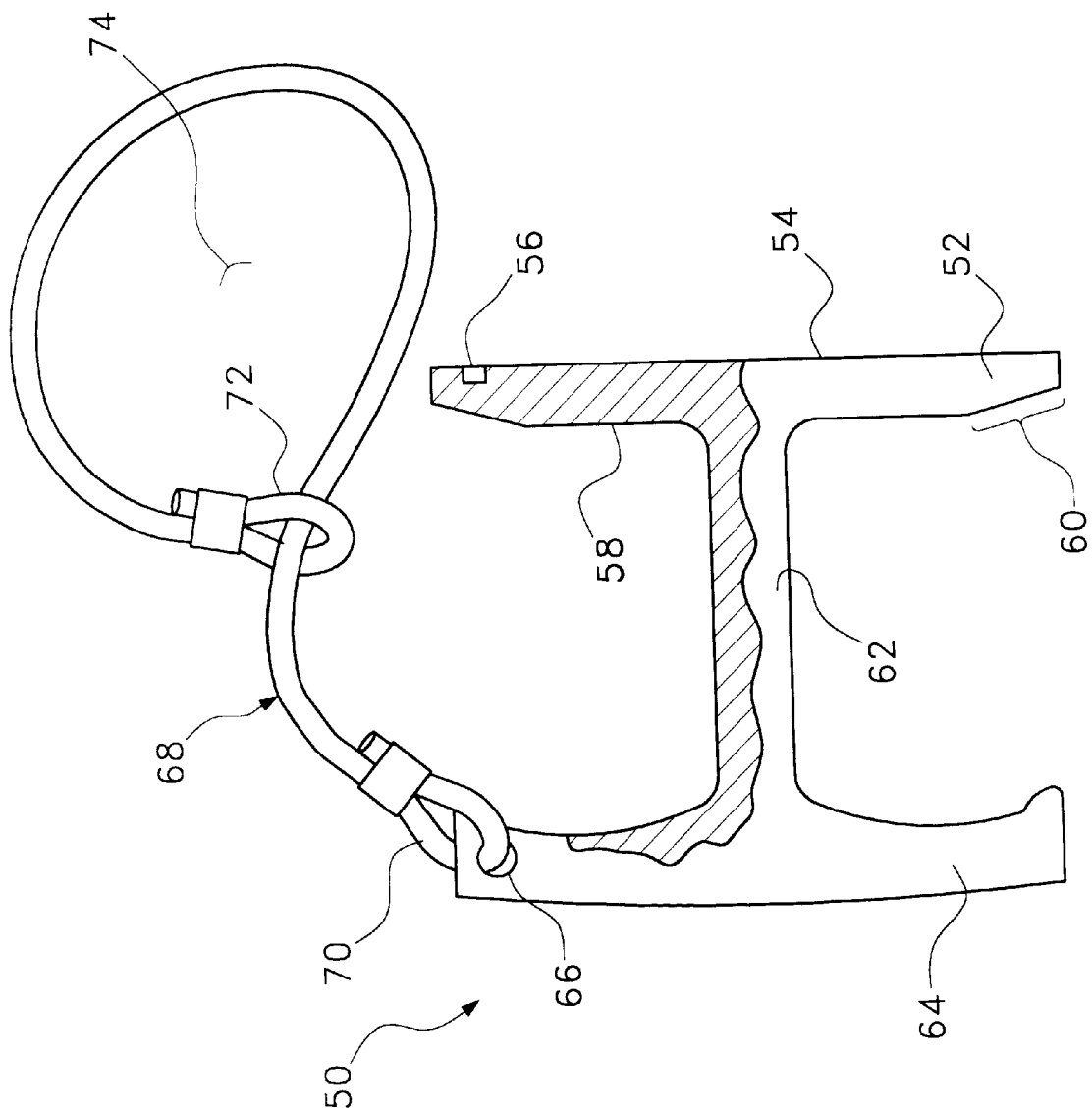
FIG. 2 is a selectively cross-sectioned side view of an end cap device in accordance with the present invention.

Referring to FIG. 2, there is shown an end cap device 50 in accordance with the present invention. The end cap device 50 has a base 52 that is shaped similar to the prior art end cap previously described in accordance with FIG. 1. The base 52 has a flat, round bottom surface 54. A groove 56 is formed in the bottom surface 54 of the base 52 near the peripheral edge. The groove 56 is positioned to align with the groove 18 (FIG. 1) in the flange of a container or pipe.

The top surface 58 of the base 52 is flat except for the area 60 proximate the peripheral edge. In the area 60 near the peripheral edge, the base 52 is beveled, wherein the top surface 58 slopes downwardly toward the bottom surface 54. The length of the beveled area 60 and the slope of the beveled area 60 are the same as are used in the prior art end caps of FIG. 1.

A shaft 62 extends upwardly from the center of the top surface 58 of the base 52. The shaft 62 is either welded to the base 52 or machined from the same piece of stock as is the base 52. In either manufacturing technique a fillet 64 is left at the junction between the shaft 62 and the top surface 58 of the base 52 to relieve structural stress and prevent fractures from developing at the junction point. By either welding the shaft 62 in place or machining the shaft 62, there is no gap, threads or cracks that exist between the base 52 and the shaft 62. Accordingly, there is no place where contaminants can become embedded and the end cap device can be readily sterilized in an autoclave.

The shaft extends away from the top surface of the base by a distance between one and five inches. In the preferred embodiment, the longitudinal axis of the shaft is perpendicular to the plane of the bottom surface 54 of the base 52.

A cross handle 64 is attached to the top end of the shaft 62, opposite the base 52. The cross handle 64 can be a straight element but is preferable rounded across its top to fit more ergonomically into a person's hand. The cross handle 64 has two opposing ends. The shaft 62 intersects the cross handle 64 at a point between the two ends. Preferably, the shaft 62 intersects the cross handle 64 at the center of the cross handle 64. The cross handle 64 is preferable either welded to the shaft 62 or machined from the same piece of stock as is the shaft 62. In this manner, there are no gaps, threads or cracks that exist between the cross handle 64 and the shaft 62. Accordingly, there is no place where contaminants can become embedded and the end cap device 10 can be readily sterilized in an autoclave. In the preferred embodiment, the cross handle 64, shaft 62 and base 52 are unistructurally formed from a non-corrosive material such as stainless steel, titanium or the like.

The length of the cross handle 64 is preferable between two and five inches. Accordingly, someone can grip the cross handle 64 by pressing the top surface of the cross handle 64 against the palm and rapping two fingers around the cross handle 64 on both sides of the shaft 62.

An aperture 66 is formed through the cross handle 64 proximate one end. The end of a tether 68 passes through the aperture 66, wherein the tether 68 joins back onto itself in an eyelet configuration 70 that causes the tether 68 to be permanently joined to the cross handle 64. The opposite end of the tether 68 also ends in an eyelet configuration 72. However, the tether 68 passes through the eyelet configuration 72 creating a noose 74. The tether 68 is preferably made of braided stainless steel. However, any material capable of being repeatedly sterilized in an autoclave without corrosion can be used.

Figure 3:
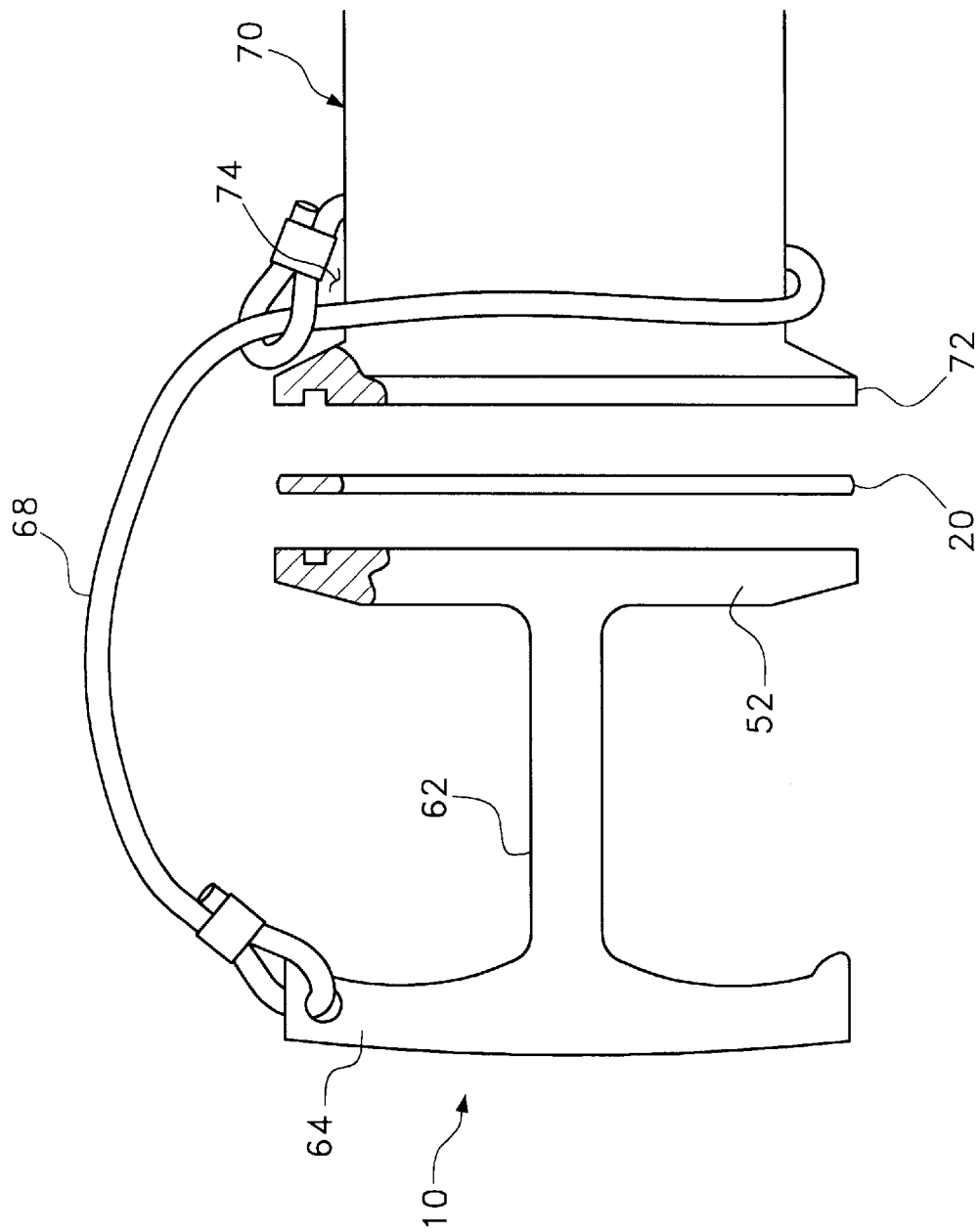
FIG. 3 is a selectively cross-sectioned side view of the embodiment of FIG. 2 shown in conjunction with a prior art container.

Referring to FIG. 3, it can be seen that to attach the end cap device 10 to a flanged opening 70, the noose configuration 74 of the tether 68 is first placed over the flange 72 of the flanged opening 70. The base 52 of the end cap device 10 is then joined to the flanged opening 70 with a pipe clamp (not shown) and an intermediate gasket 20, as has been previously described.

To remove the end cap device 10, a person grabs the cross handle 64 and applies a bending torque to the base 52 by applying a force to the cross handle 64 in a direction lateral to the longitudinal axis of the shaft 62. By using the cross handle 64 to remove the base 52, no tool is required to pry the end cap device 10. The end cap device 10 is therefore removed in a controlled manner without damage.

Referring to FIG. 3, it can be seen that when the end cap device 10 is removed, the end cap device 10 is supported by the tether 68. As a result, the end cap device 10 can not be accidentally dropped and damaged. Also, the tether 68 prevents the end cap device 10 from being placed on a contaminated surface prior to its use in sealing either a pipe or container. To remove the end cap device 10, the noose configuration 74 of the tether 68 is loosened and removed from the flange 72 of the container or the pipe. The end cap device and tether assembly can then both be cleaned and sterilized as a unit.

It will be understood that the various Figures described above illustrate only one preferred embodiment of the present invention. A person skilled in the art can therefore make numerous alterations and modifications to the shown embodiment utilizing functionally equivalent components to those shown and described. For example, there are numerous types of cross handles and tethers that can be substituted for the elements described. All such modifications are intended to be included within the scope of the present invention as defined by the appended claims.

What is claimed is:

1. An end cap device for a flanged termination, comprising:
    a circular base having a peripheral edge, a flat bottom surface of a first diameter and a top surface of a second diameter that is less than said first diameter, wherein a bevel exists between said top surface and said bottom surface proximate said peripheral edge;
    a shaft extending from said top surface of said base;
    a handle having a first end and a second end wherein said handle is coupled to said shaft at a point between said first end and said second end and wherein said shaft and said handle are unistructually fabricated from stainless steel.

2. The device according to claim 1, wherein said shaft extends from said base at an angle perpendicular to said flat bottom surface of said base.

3. The device according to claim 2, wherein said handle is oriented generally perpendicular to said shaft.

4. The device according to claim 1, further including a tether affixed to said handle.

5. The device according to claim 4, wherein said tether is braided stainless steel.

6. The device according to claim 1, wherein said handle defines an aperture proximate said first end.

7. The device according to claim 6, further including a tether affixed to said handle through said aperture.

8. The device according to claim 7, wherein said tether has a first end connected to said handle and a second end configured as a noose.

9. An end cap for a flanged termination, comprising:
 a tether of braided stainless steel having a first end and a second end, wherein said tether is configured into a noose at said second end;
 a cap element sized to cover said flanged termination;
 a handle rigidly affixed to said cap element, wherein said handle defines an aperture and said first end of said tether extends through said aperture.

10. The device according to claim 9, wherein said tether, said cap element and said handle are all stainless steel.

11. The device according to claim 9, wherein said cap element and said handle are unistructurally fabricated as a single unit.

12. The device according to claim 9, wherein said cap element includes a circular base having a peripheral edge, a bottom surface and a top surface, wherein said top surface is beveled toward said bottom surface proximate said peripheral edge.

13. The device according to claim 12, wherein said handle includes a shaft extending from said top surface of said base and a cross element that intersects said shaft generally at a perpendicular.

14. The device according to claim 13, wherein said cross element has a first end and a second end and said cross element is coupled to said shaft at a point generally halfway between said first end and said second end.

15. An end cap device for a flanged termination, comprising:
 a circular base having a peripheral edge, a flat bottom surface of a first diameter and a top surface of a second diameter that is less than said first diameter, wherein a bevel exists between said top surface and said bottom surface proximate said peripheral edge;
 a shaft extending from said top surface of said base;
 a handle having a first end and a second end wherein said handle is coupled to said shaft at a point between said first end and said second end and wherein said handle defines an aperture proximate said first end.

* * * * *